United States Patent
Lee et al.

(10) Patent No.: US 6,746,003 B2
(45) Date of Patent: Jun. 8, 2004

(54) GAS-LIQUID CONTACTING APPARATUS

(75) Inventors: Adam T. Lee, Dallas, TX (US); Francis W. Lemon, Ottawa (CA)

(73) Assignee: AMT International, Inc., Richardson, TX (US)

( * ) Notice: Subject to any disclaimer, the term of this patent is extended or adjusted under 35 U.S.C. 154(b) by 80 days.

(21) Appl. No.: 10/226,763

(22) Filed: Aug. 26, 2002

(65) Prior Publication Data

US 2004/0036186 A1 Feb. 26, 2004

(51) Int. Cl.$^7$ .................................. B01F 3/04
(52) U.S. Cl. ................... 261/114.1; 261/114.5
(58) Field of Search ................ 261/114.1, 114.2, 261/114.3, 114.4, 114.5; 202/158

(56) References Cited

U.S. PATENT DOCUMENTS

| | | | | |
|---|---|---|---|---|
| 2,274,030 A | * | 2/1942 | Aktins, Jr. ................ | 208/335 |
| 3,410,540 A | * | 11/1968 | Bruckert .................... | 261/113 |
| 4,129,626 A | * | 12/1978 | Mellbom ................... | 261/114.3 |
| 4,446,651 A | * | 5/1984 | Spitz et al. ................. | 47/10 |
| 5,382,390 A | * | 1/1995 | Resetarits et al. ........ | 261/114.3 |
| 5,547,617 A | * | 8/1996 | Lee et al. .................. | 261/114.5 |

OTHER PUBLICATIONS

Performance of Multiple Downcomer Trays, W. V. Delnicki, and J. L. Wagner, Chemical Engineering Progress, vo. 66, No. 3, Mar. 1970, pp. 50–55.
MD Trays Can Provide Savings in Propylene Purification, R. D. Kirkpatrick, PetroChemicals, The Oil and Gas Journal, Apr. 3, 1978.

* cited by examiner

Primary Examiner—Scott Bushey
(74) Attorney, Agent, or Firm—Francis W. Lemon

(57) ABSTRACT

A gas-liquid contacting apparatus is provided wherein the perforated trays are divided into portions by a lattice-like pattern of downcomers which deliver liquid to central regions of the tray portions immediately below them. An odd number, X, for example three parallel downcomers which are at right angles to an even number or X–1, for example two parallel downcomers are provided so that adjacent trays be turned at right angles so that the downcomers of the upper tray extend centrally between the downcomers of the lower tray. The downcomers reduce stagnant liquid regions, distribute the liquid more evenly on the trays and allow longer flow paths to be provided on the trays.

13 Claims, 4 Drawing Sheets

GAS-LIQUID CONTACTING APPARATUS

FIELD OF THE INVENTION

This invention relates to a gas-liquid contacting apparatus.

BACKGROUND OF THE INVENTION

Perforated trays with downcomers are the most commonly used internals in industrial columns for contacting a gas and a liquid. In such columns, liquid flows across the trays and down through the downcomers, from tray to tray, while gas permeates upwardly through the trays foaming liquid thereon.

U.S. Pat. No. 3,410,540, dated Nov. 12, 1968, Bruckert, describes perforated trays having multiple downcomers. With these trays, multiple downcomers, e.g. five downcomers, extent along parallel paths across the tray, more or less equally spaced across the column. The multiple downcomers of adjacent trays extend along paths which are at right angles to one another so that outlets from the downcomers can be arranged to direct liquid onto the tray below, between its downcomers, as will be seen from "Performance of Multiple Downcomer Trays" W. V. Delivicki and J. L. Wagner, Chemical Engineering Progress, Vol. 66, No. 3, March 1970, pages 50–55, and "MD Trays Can Provide Savings in Propylene Purification" R. D. Kirkpatrick, Petrochemicals, The Oil and Gas Journal, Apr. 3, 1978.

In summary, multiple downcomer trays have liquid seals formed above spouts at lower ends and so avoid using any tray area for the this purpose, thus increasing the tray active area, use shorter liquid flow paths across the trays, thus reducing hydraulic gradients on the trays, spread the liquid loadings over the greater number of downcomers, thus allowing better control of foam height over wider ranges of liquid and gas flow rates providing higher rangeability, and allow the downcomers to be used as a primary support for the tray.

While these multiple downcomer trays are an advance in the art, a problem exists with them in that the downcomers give poor liquid flow distribution on the tray below which results in stagnant areas thereon with regard to liquid flow thereacross. U.S. Pat. No. 5,382,390, dated Jan. 17, 1995, M. R. Resetarits and M. J. Lockett, teaches minimizing this problem by providing gas directing slots in the tray for directing gas towards the closet downcomers and reduce froth height.

While the gas directing slots reduce the stagnant liquid flow area to some degree, there is still a need for a gas-liquid contacting apparatus wherein the formation of stagnant liquid areas on the trays is substantially reduced.

SUMMARY OF THE INVENTION

According to the present invention there is provided a gas-liquid contacting apparatus, comprising a) an upwardly extending casing having a liquid inlet to, and a gas outlet from, a top end portion thereof, and a gas inlet to, and liquid outlet from, a lower end portion, thereof, b) a plurality of perforated tray assemblies partitioning the casing at different levels between the said upper and lower portions thereof, each tray assembly comprising an array of perforated sheets, at least major portions of which are separated from one another by a lattice-like-pattern of liquid receiving channels, and for each pattern of channels, c) a correspondingly patterned downcomer weir and duct means encasing those channels and receiving liquid from the perforated sheets separated thereby, d) liquid delivery means attached to duct portions, of the weir and duct means, for maintaining a liquid seal in the duct portions, and for delivering liquid from the duct portions to a central region of each perforated sheet immediately therebelow Portions of the weir and duct means of each upper tray assembly may cross the said central regions of the said perforated sheets immediately therebelow.

The duct portions of a weir and duct means are preferably interconnected to more evenly distributed the flow of liquid over the tray assembly immediately therebelow.

The lattice pattern may be square shaped.

The duct portions of adjacent tray assemblies may extend across the casing in substantially the same directions, with the duct portions of adjacent tray assemblies laterally displaced from one another.

The duct portions may follow a lattice pattern formed of an odd number X of parallel ducts extending in one-direction, crossed by an even number X−1 of parallel ducts extending along a direction at right angles thereto, and the ducts may be spaced sideways from one another, with the odd number ducts of adjacent tray assemblies extending at right angles to one another, so that the ducts of the upper tray assemblies pass over central regions of the perforated sheets of the tray assembly immediately therebelow.

The ducts may be troughs, and the liquid delivery means may be grills at the bottoms of the troughs.

The upwardly extending casing may be circular in plan view, and the liquid delivery means may further comprise closed topped casings attached to both sides of portions of a duct which extend over segment shaped portions of the perforated tray assembly therebelow, the interior of each closed topped casing may be open to the interior of the duct, to receive liquid therefrom, and may have an open bottom for discharging that liquid, and a grill may be provided over each open bottom, each grill may have slots which extend transversely to the longitudinal direction of the duct to which it is attached.

Preferably, the distances between adjacent ducts are of equal magnitude.

Liquid passages may be provided in the form of a series of openings in the weir portions.

The ends of weir portions of the X−1 ducts may be spaced from the weir portions of the X ducts to provide liquid paths around the X−1 parallel ducts.

Perforated side walled catchment trays may be provided beneath the grills.

Liquid flow distributing baffles may be provided on weir portions of the weir and duct means.

End portions of the outer ones of the three ducts may be angled in plan view to closely follow the curvature of the casing, when the casing is circular.

In this specification, lattice-like-patterns includes lattice-like patterns where, i) liquid receiving channels are interconnected at lattice intersection, and ii) liquid receiving channels terminate before lattice intersection.

BRIEF DESCRIPTION OF THE DRAWINGS

In the accompanying drawings which illustrate, by way of example, embodiments of the present invention.

DETAIL DESCRIPTION OF THE PREFERRED EMBODIMENTS

Figure 1:
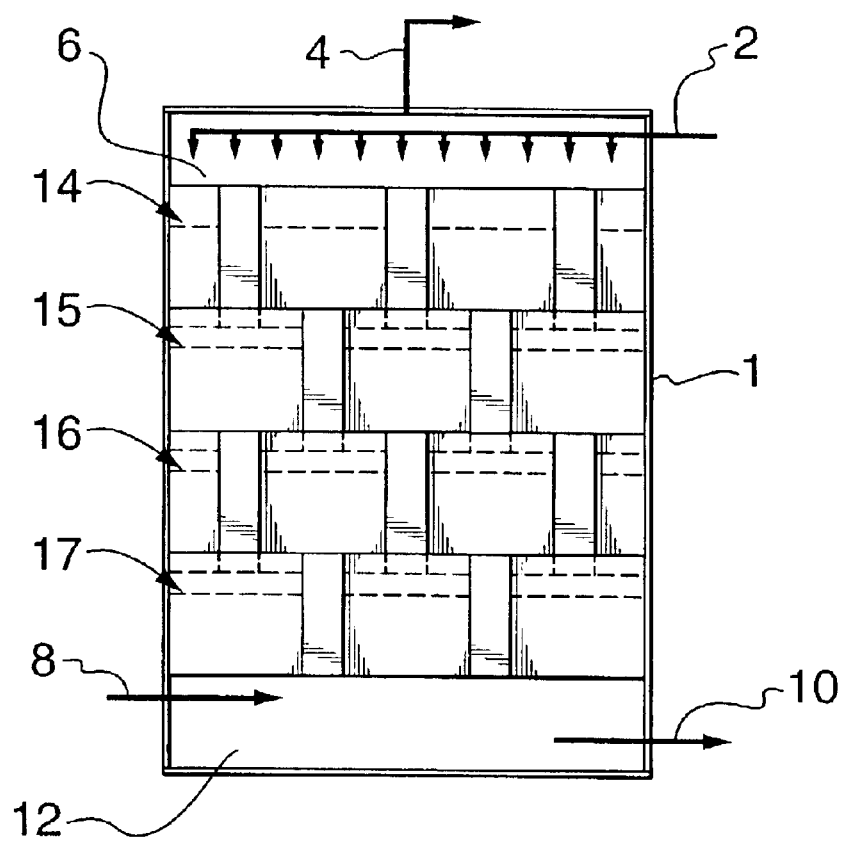
FIG. 1 is a schematic, side view of a gas-liquid contacting apparatus.

Referring now to FIGS. 1 to 4, there is shown a gas-liquid contacting apparatus, comprising, a) an upwardly extending casing 1 (FIG. 1) having a liquid inlet 2 to, and a gas outlet 4 from, a top end portion 6 thereof, and a gas inlet 8 to and a liquid outlet 10 from, a lower end portion 12 thereof, b) a plurality of perforated tray assemblies generally designated 14 to 17 partitioning the casing 1 at different levels between the upper portion 6 and the lower portion 12 thereof, each tray assembly 14 to 17 comprising an array of perforated sheets 18 to 25 (FIG. 2), at least major portions of which are separated from one another by a latticed-like-pattern of liquid receiving channels 26, and for each pattern of channels 26, c) a correspondingly patterned, downcomer weir and duct means, generally designated 28, encasing those channels and for receiving liquid from the perforated sheets 18 to 25 separated thereby, and d) liquid delivery means, in the form of grills 34 to 41 (FIGS. 3 and 4), attached to duct portions 31 of the weir and duct means 28 for maintaining a liquid seal in the duct portions 31 and, for each upper tray assembly 14 to 16, delivering liquid from the duct portions 31 to a central region of each perforated sheet 18 to 25 (FIG. 2) immediately therebelow.

Figure 2:
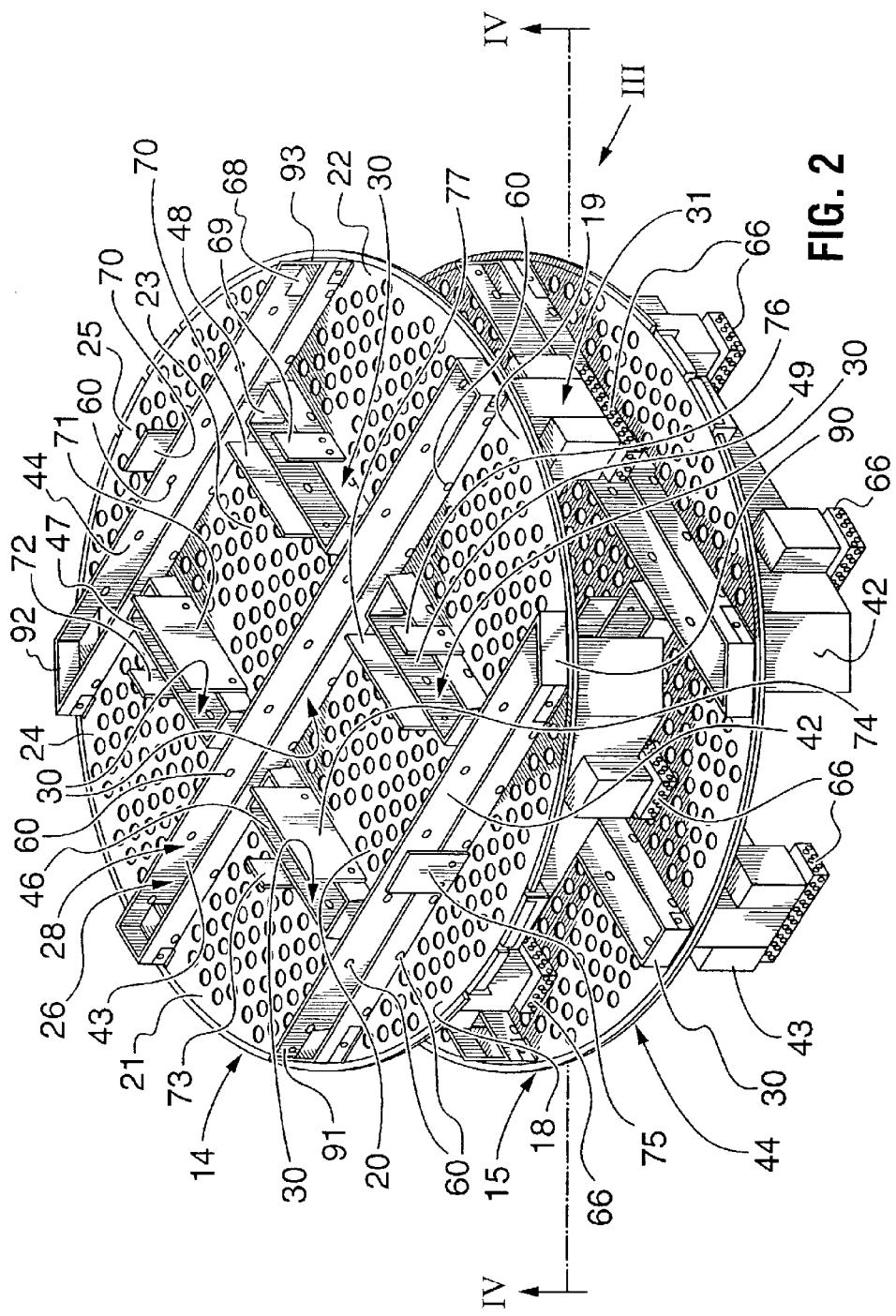
FIG. 2 is an angular view from above, of two of the perforated tray assemblies of FIG. 1.
Figure 3:
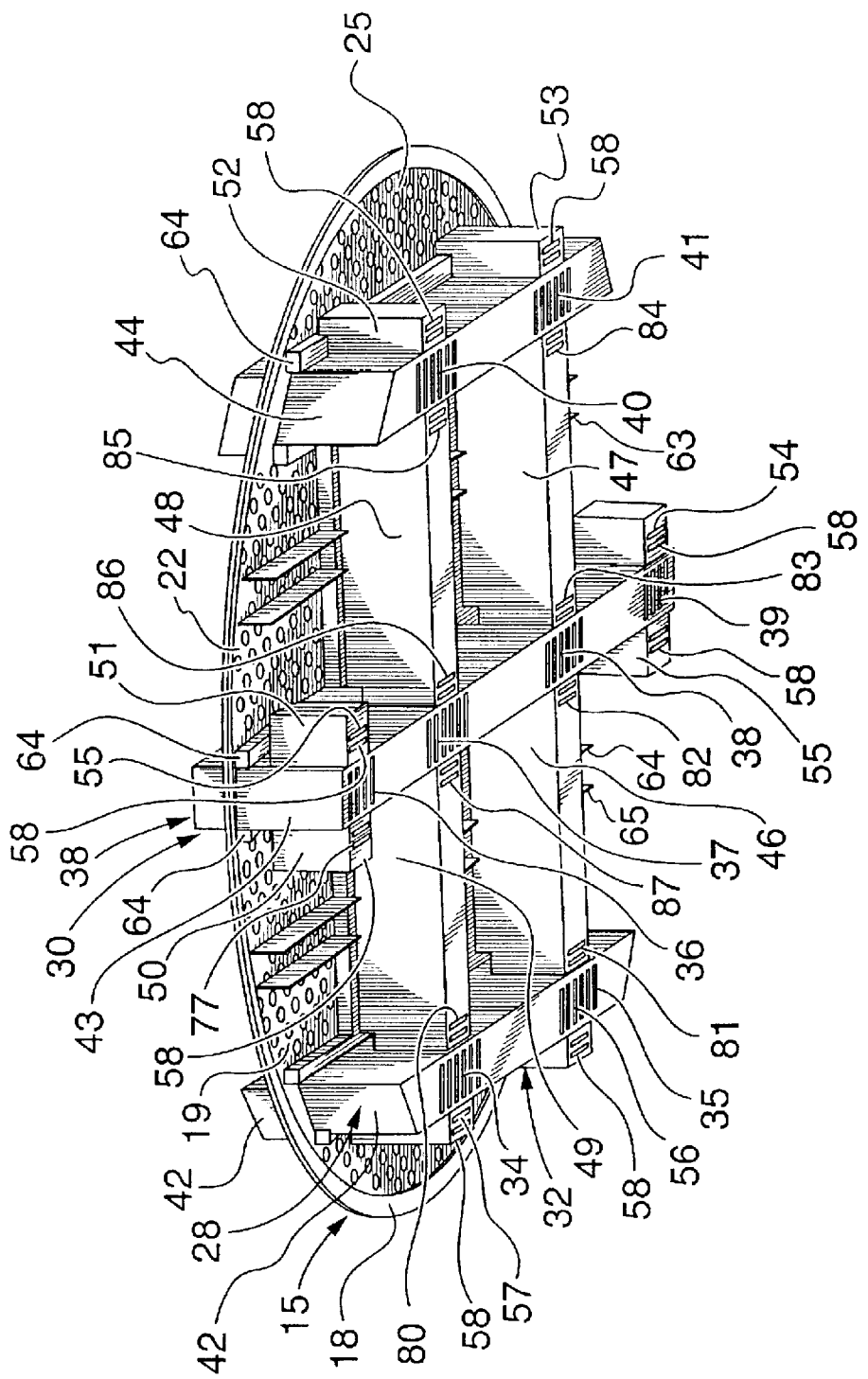
FIG. 3 is an angular view from an underside of the upper perforated tray of FIG. 2, in the direction III, FIG. 2.

As will be seen in FIGS. 2 and 3, in this embodiment of the present invention, portions of the weir and duct means 28 of each upper tray assembly 14 to 16 cross central regions of the perforated sheets 18 to 25 (FIG. 2) immediately therebelow.

Figure 4:
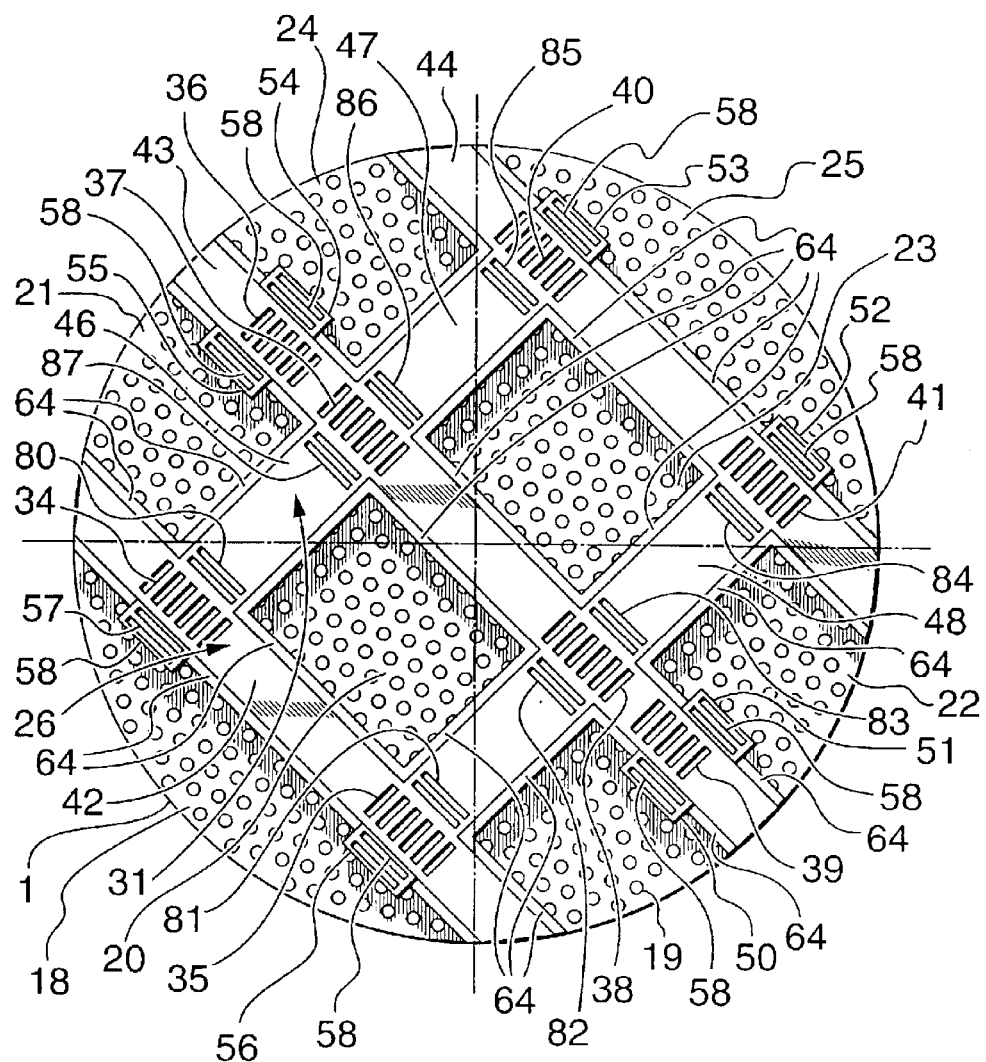
FIG. 4 is a schematic, sectional underside view along IV—IV, FIG. 2, of the bottom of a perforated tray assembly with the casing therearound.

As shown in FIG. 4, the duct portions 31 of a weir and duct means 28 are interconnected to more evenly distribute the flow of liquid over the tray assembly 15 to 17 immediately therebelow.

While in this embodiment of the present invention the lattice-like-pattern is square shaped, in other embodiments it may be, for example, diamond shaped.

The advantage of a lattice pattern is that all of the patterns can extend across the casing 1 in substantially the same directions with the lattice patterns of adjacent tray assemblies 15 to 17 laterally displaced from one another to extend, as shown in FIG. 2, over the said central regions of the perforated sheets 18 to 25 immediately therebelow. This facilitates the delivery of liquid to the said central regions. To this end, as shown in FIGS. 2 and 3, in this embodiment of the present invention, each weir and duct means 28 follows a lattice pattern with the duct portions 31 comprising of an odd number X, in this embodiment three, parallel ducts 42 to 44 extending in one direction, essentially bridged by an even number X–1, in this embodiment two, parallel ducts 46 to 49 extending along a direction at right angles thereto. The ducts 42 to 44, and 46 to 49 are equally spaced sideways from one another, so that by simply rotating adjacent tray assemblies 14 to 17 as shown in FIG. 2, for the ducts 42 to 44, and 46 to 49 of adjacent trays 14 to 17 to lie at right angles to one another, the ducts of upper tray assemblies 14 to 16 (FIG. 1) are placed to pass over central regions of the perforated sheets 18 to 25 (FIG. 2) of the tray assemblies 15 to 17 immediately therebelow.

While, for clarity, a ratio of 3:2 ducts 42 to 44 to ducts 46,47 and 48, 49 are show, greater numbers are used in larger casings 1.

FIG. 4 shows the ducts 42 to 44, and 46 to 49 interconnected to more evenly distribute liquid over the tray assembly below.

The upwardly extending casing 1 (FIG. 4) is circular in plan view, and the liquid delivery means, in the form of the grills 34 to 41 (FIGS. 3 and 4), further comprises closed topped casings, such as those designated 50 to 57 attached to the sides of portions of ducts 42 to 44, which extend over segment shaped perforated sheets 18 and 25 (FIGS. 2 and 3), of perforated tray assemblies 15 and 17, therebelow, the interior of each closed topped casing 50 to 57 is open to the interior of the ducts 42 to 44 to which it is attached to receive liquid therefrom and has a liquid outlet grill 58 at the bottom for maintaining the liquid seal in the ducts 42 to 44, and 46 to 49.

Liquid passages in the form of a series of openings 60 (FIG. 2) are provided along the weir portions 30. The liquid drainage openings 60 deliver liquid during start up to the ducts 42 to 44, and 46 to 49. The ends of the weir portions 30 of ducts 46 to 49 are spaced from the ducts 42 to 44 to provide paths for the liquid to flow around the ducts 46 to 49 and distribute liquid between the perforated sheet 19 to 21, and 20 to 24, thus more evenly distributing the liquid thereon.

The perforated sheets 18 to 25 are supported by ledge members extending along, and attached to the sides of the ducts 42 to 44 and 46 to 49.

Liquid distributing, catchment trays 66 (FIG. 2) with perforated side walls are provided beneath the grills 34 to 41 and 58 (FIG. 3) to further enhance liquid distribution over perforated sheets 19 to 24. The side walls of the catchment trays 66 may be of expanded metal sheet.

Baffles, such as those designated 68 to 77 (FIG. 2) are provided on the weir portions 30 to more evenly distribute the flow of liquid over the weir portions 30.

In this embodiment, additional grills 80 to 87 (FIGS. 3 and 4) are provided in the ducts 46 to 49, over the catchment trays 66 (FIG. 2) for a more even distribution of liquid on the perforated sheets 18 to 25 therebelow.

Further, in this embodiment, the ends 90 to 93 (FIG. 2) of the ducts 42 and 44 are angled in plan view to closely follow the curvature of the casing 1 for better distribution of liquid over weir portions 30 at the ends of the longer sides of these ducts 42 and 44.

In operation, liquid fed to the casing 1 (FIG. 1) by the liquid inlet 2 is distributed over the perforated tray assembly 14 while gas fed to the casing 1 by gas inlet 8 flows upwardly through the perforations in the perforated tray assemblies 14 to 17.

The liquid distributed on the tray assembly 14 flows across the perforated sheet portions 18 to 25 (FIG. 2) to the network 26 of drainage channels 26. As the liquid flows across the perforated sheet portions 18 to 25 it is frothed thereon by gas flowing upwardly through the perforations in them. During start-up, at low liquid flow rates, frothed liquid flows through the liquid drainage openings 60. When the frothed liquid reaches the desired depth, it spills over the weir portions 30 and drains into the downcomer duct means 28.

The grills 34 to 41 (FIG. 3) form a flow constriction for the liquid spilling into them so that a liquid seal is maintained in the duct means 28 on the grills 34 to 41.

Liquid draining from the grills 34 to 41 falls on to central regions of the perforated sheet portions 18 to 25 (FIG. 2) of perforated sheet assembly 15 (FIG. 1) where the process of foaming the liquid is repeated as it flows to the downcomer duct means 28, where the overflow process is again repeated.

This process is repeated for all of the perforated tray assemblies until the liquid finally collects in the bottom of the casing 1 (FIG. 1) and is withdrawn therefrom by the liquid outlet 10, while the upwardly flowing gas exits the casing 1 by the gas outlet 4.

The liquid flowing out of the grills 34 to 41 (FIG. 3), from the duct means 28 flows from central regions of the perforated sheet portions 18 to 25 (Figure) in all directions thereover, which enhances the uniformity of the distribution of the liquid thereon, while substantially eliminating stagnant flow regions encountered with known perforated trays. Another desirable feature is that the liquid flow paths are significantly longer than, and achieve better gas-liquid contact than known perforated tray assemblies.

This uniformity of the distribution of the liquid over the segment shaped perforated sheet portions, such as that designated 22 (FIG. 2), is further enhanced by the provision of the closed top casings, such as those designated 50 to 57, fitted with grills 58.

The additional grills 80 to 87 enhance the distribution of liquid over the perforated sheets 18 to 25 therebelow.

The catchment trays 66 beneath the grills 34 to 41, 58 and 80 to 87 provide better distribution of liquid over the perforated sheet portions on which they are situated.

The heights and the widths of the baffles 68 to 78 are chosen to more evenly distribute the flow of liquid over the weir portions 30.

It should be noted that the stepped portions 64 of the ducts 42 to 44 and 46 to 49, break the fall of liquid flowing into the ducts, particularly at low liquid flow start-up times, and facilitate the build-up of liquid seals in the ducts 42 to 44 and 46 to 49.

In different embodiments of the present invention adjacent downcomers are not parallel to one another and may, for example, extend along diverging paths.

In yet other embodiments of the present invention, the downcomers do not extend along straight paths but instead, extend along paths containing one or more curves, angles, or which are crooked in any other manner.

We claim:

1. A gas-liquid contacting apparatus, comprising,
   a) an upwardly extending casing having a liquid inlet to, and a gas outlet from, a top end portion thereof, and a gas inlet to, and liquid outlet from, a lower end portion thereof,
   b) a plurality of perforated tray assemblies partitioning the casing at different levels between the said upper and lower portions thereof, each tray assembly comprising an array of perforated sheets, at least major portions of which are separated from one another by a lattice-pattern of liquid receiving channels, and for each pattern of channels,
   c) a correspondingly patterned downcomer weir and duct means encasing those channels and for receiving liquid from the perforated sheet portions separated thereby,
   d) liquid delivery means attached to duct portions, of the weir and duct means, for maintaining a liquid seal in the duct portions, and for delivering liquid from the duct portions to a central region of each perforated sheet portion immediately therebelow.

2. An apparatus according to claim 1, wherein portions of the weir and duct means of each upper tray assembly cross the said central regions of the said perforated sheets immediately therebelow.

3. An apparatus according to claim 1, wherein the duct portions of a weir and duct means are interconnected to more evenly distribute the flow of liquid over the tray assembly immediately therebelow.

4. An apparatus according to claim 2, wherein each lattice-pattern is square shaped.

5. An apparatus according to claim 3, wherein the duct portions of adjacent tray assemblies extend in substantially the same directions, with the duct portions of adjacent tray assemblies laterally displaced from one another.

6. An apparatus according to claim 4, wherein the duct portions follow a lattice pattern formed of an odd number X of parallel ducts extending in one direction, crossed by an even number X−1 of parallel ducts extending along a direction at right angles thereto, and the ducts are spaced sideways from one another, with the odd number ducts of adjacent tray assemblies extending at right angles to one another, so that the ducts of the upper tray assemblies pass over central regions of the perforated sheets of the tray assembly immediately therebelow.

7. An apparatus according to claim 6, wherein the ducts are troughs, and the liquid delivery means are grills at the bottom of the troughs.

8. An apparatus according to claim 7, wherein the upwardly extending casing is circular in plan view, and the liquid delivery means further comprises closed topped casings attached to both sides of portions of a duct which extend over segment shaped portions of the perforated tray assembly therebelow, the interior of each closed topped casing being open to the interior of the duct, to receive liquid therefrom, and having an open bottom for discharging that liquid, and a grill is provided over each open bottom, each grill having slots which extend transversely to the longitudinal direction of the duct to which it is attached.

9. An apparatus according to claim 6, wherein the distances between adjacent ducts are of equal magnitude.

10. An apparatus according to claim 6, wherein liquid passages in the form of a series of openings are provided in the weir portions.

11. An apparatus according to claim 10, wherein the ends of weir portions of the X−1 parallel ducts are spaced from the weir portions of the X ducts to expose perforated plate, and a series of openings are provided, which extend along the sides of the X−1 ducts in perforated plate thus exposed.

12. An apparatus according to claim 7, further comprising perforated side walled, catchment trays beneath the grills.

13. An apparatus according to claim 1, further comprising liquid flow distributing baffles on weir portions of the weir and duct means.

* * * * *